United States Patent [19]

Yamada et al.

[11] Patent Number: 5,037,695
[45] Date of Patent: Aug. 6, 1991

[54] MAGNETIC RECORDING MEDIUM

[75] Inventors: Hiroyuki Yamada; Norifumi Kajimoto; Ikuko Yanagiuchi, all of Tokyo, Japan

[73] Assignee: TDK Corporation, Tokyo, Japan

[21] Appl. No.: 500,539

[22] Filed: Mar. 28, 1990

[30] Foreign Application Priority Data

Mar. 28, 1989 [JP] Japan .................................. 1-73742

[51] Int. Cl.$^5$ ............................................ G11B 23/00
[52] U.S. Cl. ..................................... 428/329; 428/694; 428/900
[58] Field of Search ................ 428/329, 402, 694, 900

[56] References Cited

U.S. PATENT DOCUMENTS

| | | | |
|---|---|---|---|
| 4,015,042 | 3/1977 | Chassaigne | 428/325 |
| 4,568,619 | 2/1986 | Hiller | 428/694 |
| 4,590,127 | 5/1986 | Hashimoto et al. | 428/900 |
| 4,756,962 | 7/1988 | Takamatsu et al. | 428/694 |
| 4,803,121 | 2/1989 | Kyoke et al. | 428/329 |
| 4,828,925 | 5/1989 | Miyake et al. | 428/694 |
| 4,830,906 | 5/1989 | Nishikawa et al. | 428/329 |
| 4,837,083 | 6/1989 | Kuroda et al. | 428/329 |

*Primary Examiner*—Paul J. Thibodeau
*Attorney, Agent, or Firm*—Marshall, O'Toole, Gerstein, Murray & Bicknell

[57] ABSTRACT

A magnetic recording medium comprising a non-magnetic substrate and a magnetic layer thereon containing a ferromagnetic $CrO_2$ powder dispersed in a resin binder. The magnetic layer contains 0.01–1.0 wt % of $Al_2O_3$ powder on the basis of the $CrO_2$ powder so as to improve wear of magnetic heads.

2 Claims, 1 Drawing Sheet

MAGNETIC RECORDING MEDIUM

TECHNICAL FIELD

This invention relates to a magnetic recording medium, and more particularly to a magnetic recording medium using a ferromagnetic chromium oxide($CrO_2$) powder as a ferromagnetic material.

BACKGROUND OF THE INVENTION

Magnetic recording media used for audio recording, video recording and computers are brought into severe running contact with magnetic heads. Accordingly, magnetic recording media which use a hard ferromagnetic $CrO_2$ powder in their magnetic layers easily wear the magnetic heads, compared with magnetic recording media which use a softer ferromagnetic $\gamma$-$Fe_2O_3$ powder. Accordingly, magnetic recording media having a reduced wearing effect on magnetic heads and capable of assuring a long life of the magnetic heads are sought for in the case of a ferromagnetic $CrO_2$ powder being used in the magnetic layer. In order to overcome this drawback, it has been proposed to incorporate a nonmagnetic powder having a lower Moh's hardness than the ferromagnetic $CrO_2$ powder into the magnetic layer as an additive. For example, Japanese Patent Kokai No.60-7620 and its counterpart U.S. Pat. No. 4,568,619 (Feb. 4, 1986) disclose addition of a powder having a Moh's hardness less than that of the $CrO_2$ powder, such as zinc oxide, $\alpha$-iron oxide, non-magnetic chromium oxide, silica or the like, which is incorporated in the magnetic layer together with the ferromagnetic $CrO_2$ powder in an amount between 20 and 50 vol% based on the total amount of the powders. It is described that the additives are used for reducing head wear. Although the additives improve the head wear problem on one hand, the existence of a substantial amount of the nonmagnetic additives lowers the electromagnetic conversion characteristics and causes stain or smear of the magnetic head. Also, U.S. Pat. No. 4,015,042 discloses addition of 2.5-9 % of an inorganic powder having a large Moh's hardness such as $Al_2O_3$, which, however, increased the head wear.

OBJECTS OF THE INVENTION

Accordingly, the object of the invention is to provide a magnetic recording medium having a magnetic layer comprising a ferromagnetic $CrO_2$ powder dispersed in a resin binder, which suppresses not only the head wear but also the head smear, without impairing electoromagnetic conversion properties.

SUMMARY OF THE INVENTION

The inventors have conducted an extensive study to solve the problems associated with the conventional magnetic layer containing a ferromagnetic $CrO_2$ powder therein, including head wear, head smear and reduction in output and have found that incorporation of a very small amount of alumina ($Al_2O_3$) powder having a Moh's hardness greater than that of the ferromagnetic $CrO_2$ powder into the magnetic layer can suppress the head wear as well as the head smear without impairing its electromagnetic properties. As already discussed, with a magnetic recording medium having a magnetic layer containing $CrO_2$ therein as a ferromagnetic powder, it has been a general practice to add a substantial amount of a powder material having a Moh's hardness less than that of $CrO_2$ to lower the Moh's hardness in the surface layer of the magnetic layer to avoid the head wear, as $CrO_2$ powder itself is a very hard material.

Incidentally, the incorporation of abrasive powder in a magnetic layer such as $Al_2O_3$ having a greater Moh's hardness (Moh's hardness of about 8) than that of the hard $CrO_2$ mentioned above has not been done from the aspect of improvement in the head wear but done for enhancement of the wear resistance of the magnetic layer itself and no one could entertain an idea that they are useful for the reduction of the head wear.

In contrast, the present inventors unexpectedly have found that incorporation of a very small amount of an $Al_2O_3$ powder does not increase the head wear but on the contrary reduces the head wear. Incidentally, the larger the amount of the $Al_2O_3$ powder above the claimed range of the present invention, the greater is the head wear compared with the use of $CrO_2$ alone, which conforms to the conventional knowledge. This point will be concretely shown in the following.

BRIEF EXPLANATION OF THE DRAWING

The FIGURE shows the effect on the head wear of $Al_2O_3$ powder in the magnetic recording medium having a magnetic layer containing $CrO_2$ powder.

DETAILED EXPLANATION OF THE INVENTION $CrO_2$ powder is an acicular ferromagnetic powder having a coercive force Hc of about 650 Oe., a remnant magnetic flux density Br of about 1,450 G., and a ratio of long axis to short axis of about 0.3-0.6 and Curie point of about 125° C. The head wear was large in the conventional magnetic recording medium in which this powder was used as the Moh's hardness of this powder is large. Magnetic recording medium of this type is often used for thermal magnetic transfer utilizing the low Curie point.

Figure 1:
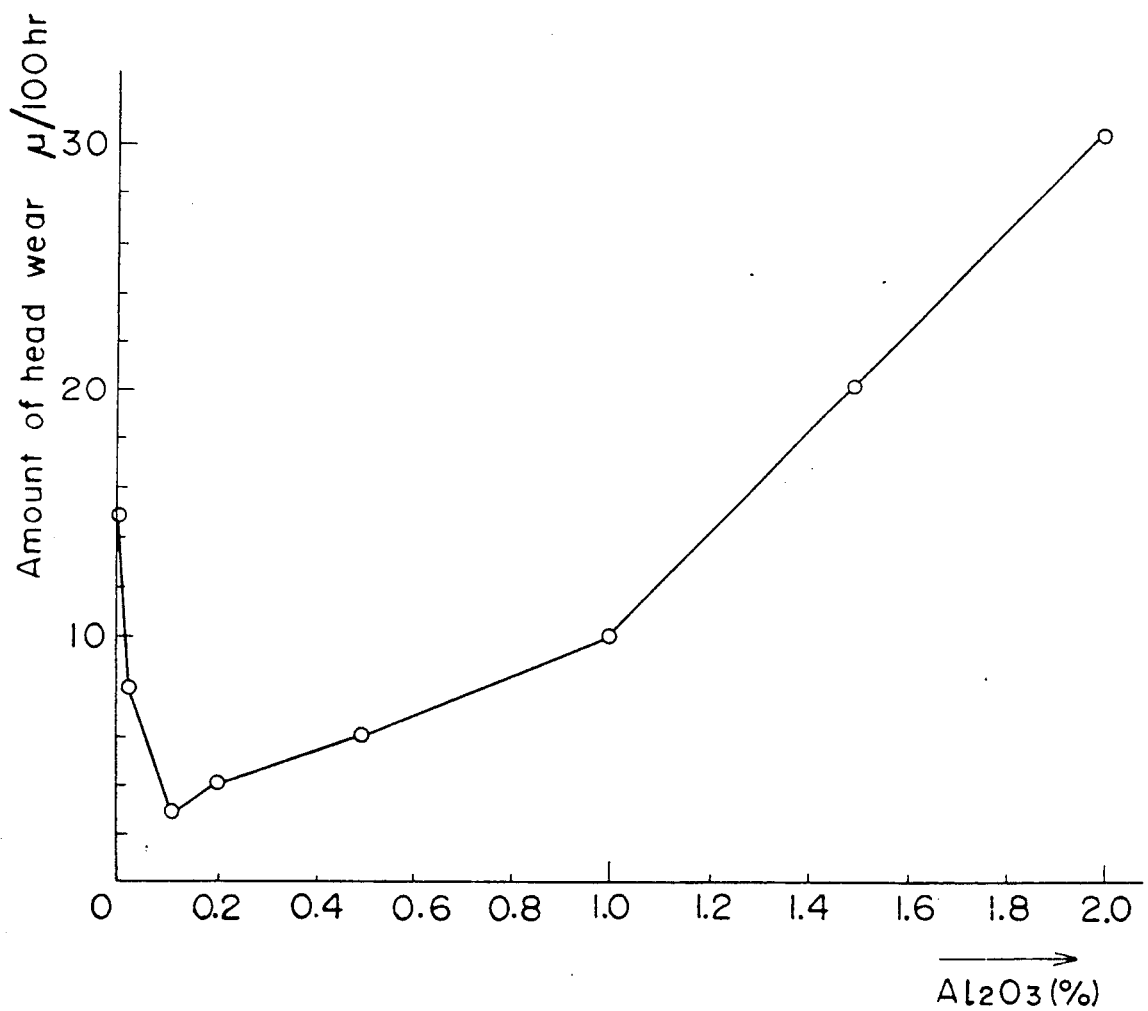

The present invention further improves such magnetic recording medium by incorporating an $Al_2O_3$ powder therein. Average particle size of the $Al_2O_3$ powder used in the present invention is in the range of 0.1-0.5$\mu$. Particle sizes above this range is not desirable because the head wear increases above this range. If the $Al_2O_3$ powder is used in an amount less than 0.01 wt% based on the weight of the $CrO_2$ powder, the head wear is not reduced. On the other hand, the amount exceeding 1.0 wt% will not significantly improve the head wear. Further addition of the $Al_2O_3$ powder will increase the head wear above the level where aluminum is not added. In contrast, the addition of 0.01-1.0 wt% has been proved to very effectively reduce the head wear.

The $CrO_2$ and $Al_2O_3$ powders are dispersed in a resin binder and applied to and hardened or cured on a nonmagnetic substrate such as polyester. As the resin binder, any known thermoplastic materials, thermosetting materials or electron-curing resin materials may be used. Preferred examples of the present invention will now be explained.

EXAMPLE

The following formulation was prepared.

| | Parts by weight |
|---|---|
| $CrO_2$ powder (Average particle size of 0.3 average axis ratio of 6.0/1) | 100 |

-continued

| | Parts by weight |
|---|---|
| α-alumina | 0-2.0 |
| Myristic acid | 0.5 |
| n-butyl stearate | 0.75 |
| Vinylchloride-vinylacetate vinylalcohol copolymer | 11.11 |
| Polyurethane | 11.11 |
| Methylethylketone | 100 |
| Cyclohexanone | 100 |
| Tetrahydrofuran | 100 |

COMPARATIVE EXAMPLE

Instead of α-alumina, 10 wt% of $TiO_2$, $CaCO_3$, ZnO and $\gamma$-$Fe_2O_3$ were respectively used in the formulation of the Example. These compositions were blended and dispersed to form magnetic coating compositions and then coated on polyester film bases of a thickness of 16μ in such a quantity that the dry thickness is 3μ. Thereafter, the coated bases were mirror-finished by a calendering roll and slit into magnetic tapes. The various properties were measured by using the following methods.

Evaluation and standard of judgement

1. Y-S/N of self-recording and reproduction

50% bright signal is recorded at a standard RF recording current and S/N of the reproduced signal is measured with a noise meter (925 D Noise Meter sold by Shiba Soku Co. in Japan) and the level must be 0.0 dB or more compared with a standard tape.

2. S/N of thermal magnetic transfer

50% bright signal is recorded on a master tape which was used for recording its signal on magnetic tapes of the $CrO_2$-containing magnetic test tapes using the thermal transfer method and S/N of the reproduced signal is measured with a noise meter (925 D Noise Meter sold by Shiba Soku Co. in Japan) and the level must be 0.0 dB or more compared with a standard tape.

3. Head wear

At a temperature of 40±2° and a relative humidity of 80 ±2.5% head wear must be less than 10 μ after 100 hours reproduction (50 times reproduction of T-120 tape).

4. Adhesion to magnetic head

At a temperature of 40±2 and a relative humidity of 80±2.5%, there must be no adhesion of stain to a cleaning sheet (SIRUBON brand polyester fiber reinforced unwoven tissue paper) after 100 hours reproduction (50 times reproduction of T-120 tape) when the magnetic head of video recorder is wiped by the cleaning sheet.

The results obtained are listed in the Table 1 and in the FIGURE. In the table VTR Y-S/N is Y-S/N of the tested tape itself and thermal transfer Y-S/N is that of the tape which received transferred signal from the tested signal.

TABLE 1

| Additive | Comparative Example | | | | Example | | | | | | | |
|---|---|---|---|---|---|---|---|---|---|---|---|---|
| | $TiO_2$ | $CaCO_3$ | ZnO | $\gamma$-$Fe_2O_3$ | $Al_2O_3$ | | | | | | | |
| weight % | 10 | 10 | 10 | 10 | 0 | 0.01 | 0.1 | 0.2 | 0.5 | 1.0 | 1.5 | 2.0 |
| Electric property VTR Y-S/N | −2.0 | −2.0 | −2.0 | 0.0 | +0.0 | +0.0 | +0.0 | +0.0 | +0.0 | +0.0 | +0.0 | |
| Therm. magnetic transfer Y-S/N | −1.5 | −1.5 | −1.5 | −3.0 | +0.0 | +0.0 | +0.0 | +0.0 | +0.0 | +0.0 | +0.0 | +0.0 |
| Head wear μ/100 hr | 8 | 6 | 5 | 6 | 15 | 8 | 3 | 4 | 6 | 10 | 20 | 30 |
| Head adhesion | X | X | X | O | X | O | O | O | O | O | O | O |

X adhesion    O no adhesion

As seen from Table 1 and the FIGURE, only when a very small amount of $Al_2O_3$ powder (0.01-1.0%) is employed, the head wear is reduced and at an amount above this range the head wear exceeds the level of a magnetic recording medium which uses $CrO_2$ alone. In the present invention, soft inorganic powders are not used and accordingly no head smear or clogging of magnetic heads is experienced. In addition, the conventional relatively soft non-magnetic inorganic powdered were not effective for suppressing the head wear unless they were used as much as 10 wt% or more. This led to a problem of reduction in output owing to less content of the magnetic powder. In the present invention there is no significant reduction in output as the inorganic powder is only slightly added.

What is claimed is:

1. A magnetic recording medium comprising a non-magnetic substrate and a magnetic layer thereon containing a ferromagnetic $CrO_2$ powder which is acicular in shape dispersed in a resin binder, characterized in that 0.01-1.0 wt.% of $Al_2O_3$ powder having an average particle size in the range of 0.1-0.5μ is contained in the magnetic layer on the basis of the $CrO_2$ powder.

2. A magnetic recording medium according to claim 1, wherein the magnetic recording medium is used as a recording medium in a thermal magnetic transfer method.

* * * * *